April 20, 1937.  G. LANE  2,077,702
SUBSTANDARD MOTION PICTURE FILM CARRYING SOUND
Original Filed Nov. 27, 1931
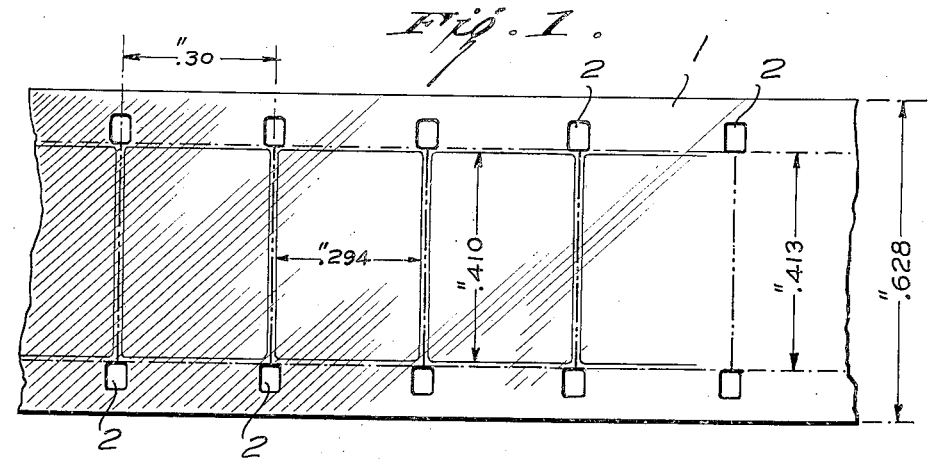
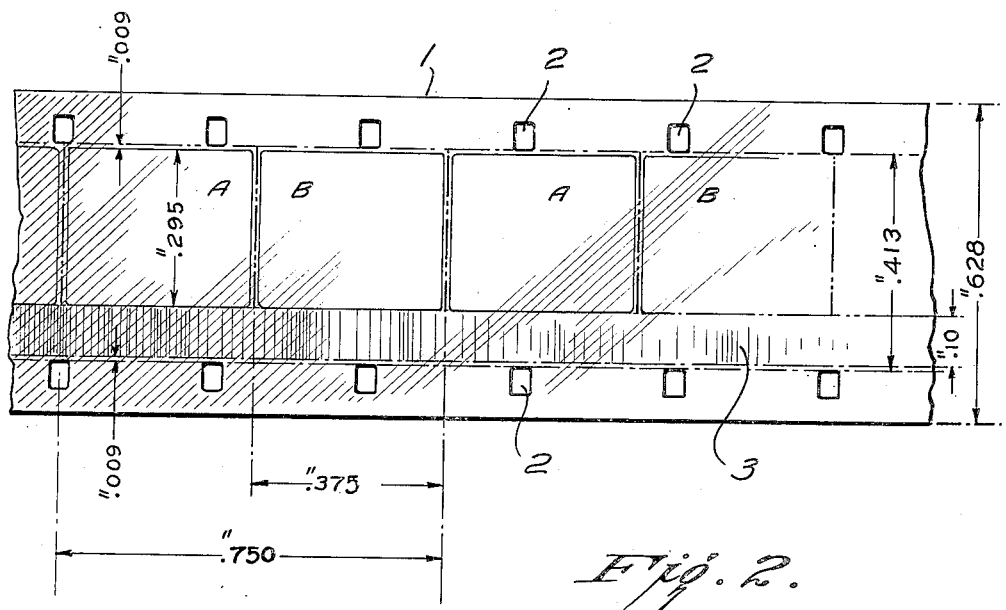
Inventor
GEORGE LANE,
By Ellis S. Middleton
Attorney Patented Apr. 20, 1937

2,077,702

UNITED STATES PATENT OFFICE 2,077,702

SUBSTANDARD MOTION PICTURE FILM
CARRYING SOUND

George Lane, New Haven, Conn.

Application November 27, 1931, Serial No. 577,436
Renewed March 14, 1936

5 Claims. (Cl. 88—16.2)

The present invention relates to a motion picture film of sub-standard size carrying both pictures or photographic images and a sound track, in which the pictures or frames are of sub-standard size while the sound track is of approximately standard size, or at least of dimensions greater than the proportionate reduction of the sub-standard pictures. The invention is further concerned with methods of producing such films and methods of producing synchronized sound and picture effects by the use of such films.

Throughout the specification and claims, where the word "standard" is used in connection with film or parts thereof, it is intended to designate a film having substantially the dimensions adopted as standard by the Society of Motion Picture Engineers. This ordinarily means a motion picture film 35 mm. in width, the dimensions of the individual frames or pictures being substantially .748 inches by .891 inches, and the sound track being substantially .100 inches in width. Where the words "sub-standard" are used, it is intended to designate film and parts of film having less than the dimensions above indicated.

The present day motion picture industry has recognized the general advantages of sub-standard size film. Due to the fact that commercial conditions as they now exist are such that film in sub-standard dimensions is made only in the so-called safety (slow burning) variety, the peculiar advantages accrue from the use of such film as its low cost, the safety feature, freedom from insurance regulations, and no requirement of fireproof booth, or of licensed operator, make its use highly desirable. Projectors for such film are, of course, much smaller and thereby cheaper, lighter, which makes the same readily portable from place to place, which is not so readily done with projectors for standard size film, and these smaller projectors using less current for operation, they may be plugged into any electric light socket, thus making every home, school or other institution desiring to show motion pictures, a potential customer. As an example of such sub-standard film, it is well-known that the 16 mm. variety has been almost universally adopted for non-theatrical purposes.

Sound has become nearly universal in professional motion picture film for amusement purposes where the films are of standard size. The use of sound with film of sub-standard width is, of course, desirable as in the case of standard size film.

The usual methods of combining sound with pictures is either to use a disc carrying the sound, the disc being run synchronously with the picture film, or to place a photographic sound track directly on the film. The portion of the film carrying the sound is known as the sound track and is either of the variable density or variable width type.

Early attempts to combine sound with pictures were generally made with a sound disc combination. This initial combination is unsatisfactory, due to the fact that it is inconvenient to handle two items, to wit, film and discs, the discs frequently become lost, or the film damaged, either of which destroys the combination. Other disadvantages are that they are difficult to synchronize and if a portion of the film or a portion of the disc is damaged, it destroys the synchronous effectiveness of the two and this effectiveness can not be readily restored, for obvious reasons. On the other hand, if the sound is carried directly by the film, the two parts are always together and cannot become misplaced, synchronization is very easily accomplished, and corrections to both sound and film may be easily made by cutting and splicing where desired. The quality of reproduction in sound from the film is recognized as being much better than that produced from a sound disc. In addition, the provision of a mechanism for rotating the disc is obviated where the sound is placed on the film.

From the above, it will be seen that it is particularly desirable to use sub-standard film for sight and sound. However, many difficulties arise when this combination is attempted, particularly in the 16 mm. film, although the same difficulties exist with other sub-standard film, of which the 28 mm. variety is another example. These difficulties do not reside in reducing the size of the picture, as this has already been done and is standard practice. The present picture can stand even more reduction if necessary, without detracting too much from its clearness and faithfulness of reproduction if the projected image is not enlarged too much and is not projected too far. The difficulty exists, however, with the adaptation of a sound track to such sub-standard film. Taking a variable density type of sound track as an example, when standard film was adapted to sound, the feed of film carrying it was stepped up from 16 to 24 frames a second, that is, from 60 to 90 feet a minute. This was because it was found desirable to increase the surface speed of the sound track in order to leave ample room to record the sound vibrations. In order to record and reproduce the higher rates of sound vibration, and secure the best quality of reproduction, more lineal length was required than had been necessary where no sound was recorded on the film.

Sub-standard film, for instance 16 mm., carries pictures proportionately smaller than those on standard film. The 16 mm. size is such that the total height of the frames, or lineal length of film occupies about four-tenths the total height of an equal number of frames of a corresponding number of picture frames from a 35 mm. film. That is, a given subject in standard film of one thousand feet, can be shown in four hundred feet on a 16 mm. film.

This means that not only is the picture size reduced, but if the sound is to be likewise transferred to this sub-standard film in the ordinary way, it must be reduced in length proportionately. Also, inasmuch as the sound track on the present standard film is of a width designed to secure maximum efficiency in recording and reproduction, any reduction in its width necessarily reduces its efficiency by just that much.

Reproduction of the higher frequencies is more important than volume because the latter can be increased by electrical amplification but if the high frequency record is not there, no amplification can supply the deficiency.

A certain amount of space is necessary on which to record a sound wave. Whatever that space may be, less space only has room for less vibration records.

The physical possibilities for sound now range in good standard recording around 7,000 cycles per second, while it has been claimed that 10,000 cycles per second has been recorded and reproduced.

No doubt microscopic delicacy in construction and manipulation of apparatus tends toward ability to record the higher frequencies.

To reduce the sound track's length to four-tenths that of standard proportionately reduces the number of sound vibrations that may be faithfully recorded. At the same time, reduction in the width of the sound track decreases the amplitude of reproduction. Obviously, therefore, reducing the dimensions of the present sound track to four-tenths, destroys its efficiency to such a point that its commercial value is nil.

For the above reasons, it has been commercial practice in reproducing sound synchronously with pictures from sub-standard film, to use the film and disc combination.

It is, therefore, the principal object of this invention to overcome the above deficiencies and produce a sub-standard film carrying sound thereon, without detracting from the efficient reproduction thereof.

Another object of the invention is to provide such a film which is readily adapted to reproduce pictures in color with maximum efficiency. It is another object of this invention to produce duplicate prints cheaply for color projection.

Another important object of the invention is to provide an improved quality of sound and picture, with better illumination in sub-standard film.

These and other objects and desirable ends are accomplished by utilizing a sub-standard width film carrying a standard width sound track, and sub-standard size pictures, the pictures being grouped in pairs, with their narrow dimensions adjacent. This arrangement is such that the pairs are regularly spaced in recurring order. The longer dimension of each two adjacent pictures may be approximately equal to the height of the standard 35 mm. picture. The speed of projection may be substantialy the same as the 35 mm., that is, 90 feet a minute, and consequently the sound track of such sub-standard film may be approximately the same length as that of the standard film. It is proposed to advance such film two frames at a time. Inasmuch as the total width, in the direction of the film's length, of two pictures on the present 16 mm. film, is substantially equal to the height of a single picture on a standard film, the lineal footage of feed is practically identical. By taking individual pictures as complementary color pairs, and projecting them through color, additive color effects may be produced.

Where black and white effects are desired, the picture pairs of this film may be exact duplicates, projected simultaneously upon the same screen area, or but a single picture may be printed, the other frame constituting the pair being left blank. By taking the two pictures of the pair from different horizontal viewpoints, that is, to constitute a stereoscopic pair, and projecting these stereoscopic complements simultaneously upon the same screen area and providing means for differentiating the individual pictures for the individual eyes of the observers, stereoscopic effects may be produced.

The invention further consists in the novel combination, construction and arrangement of parts and steps of the methods as more fully hereinafter described and shown in the accompanying drawing.

In the drawing—

Fig. 1 is a diagrammatic showing of the usual 16 mm. film strip.

Fig. 2 is a diagrammatic showing of a 16 mm. film strip modified for sound according to this invention.

Referring now to the drawing, a sub-standard film is shown generally at 1, for example 16 mm. in width. In such a film the dimension between sprocket holes 2 across the film is approximately .413 inches and the normal dimensions of the individual picture frames in such film is approximately .294 inches by .410 inches. The normal feed of such sub-standard film is .30 inches as indicated.

In Fig. 2, the sub-standard film of this invention is illustrated which has by way of example, the same normal dimensions as to width and sprocket spacings as the 16 mm. film of Fig. 1. The sound track is shown at 3, of the same width as used in standard 35 mm. pictures, to wit, .100 inches. Deducting .009 inches for a margin between the sound track and the sprocket hole line on one edge, and the same amount inside the opposite line of sprocket holes, leaves an available width of .295 for the pictures. The rectangular picture frames have their longer dimensions parallel to the film length.

By utilizing two and one-half 16 mm. sprocket aperture spacings for two picture widths and their divisional spaces, if any, we have .375 inches available for our picture and its adjacent spacing, if any. It is proposed to feed two of these picture spaces per intermittent movement, which is substantially the lineal feed of 35 mm. film per intermittent movement.

The unshrunk length of 35 mm. film per intermittent movement is .748 inches. The unshrunk spacing of sprocket apertures in 16 mm. film is .30 inches. It will be noted that two and one-half apertures of 16 mm. film is .750 inches of lineal measurement, while the 35 mm. intermittent movement is .748 inches, that is, the two are substantially equal. Thus, substantially, the same lineal feed of film per cycle of intermittent movement of a 35 mm. film is about twice the greater dimension of a picture here; that is, the sum of the longer dimensions of two rectangular picture frames of Fig. 2 is substantially equal to the shorter dimension of a standard rectangular picture frame on a standard 35 mm. sound film. Therefore, each movement of this film feeding two pictures. Its lineal feed or shift is the same as that found most desirable with standard or 35 mm. film, with all of its attendant advantages. The width and lineal footage of the sound track 3 being the same as in standard size film, the same quality and volume of tone reproduction is possible with this sub-standard film.

An inspection of Fig. 2 will show that the important feature of this invention being that two sub-standard pictures can be placed end to end and thus substantially equal the normal picture height or feed of a 35 mm. film, the actual narrow dimension of the sub-standard picture of this invention becomes unimportant as long as sufficient room is left for a sound track of standard 35 mm. quality, which means essentially length.

Double projection, that is the simultaneous projection of two frames onto the same single area is well-known. For instance, this may take place from two laterally adjacent gates in the projector with appropriate division and twin lenses adjusted to superimpose the two pictures simultaneously. This present invention is not concerned with any particular method of or mechanism for causing these pictures to be projected, nor is it thought necessary to illustrate one, it being well-known. The projection of such a picture film as is illustrated in Fig. 2 presents no problem.

When desiring black and white effects from such picture pairs, it is contemplated that each picture of the pair will be identical, that is, a picture may be printed twice, after which the next successive picture is printed twice. In this way, with perfect registration, any moving object is depicted in the same position as projected by each lens and no fringing will result. By using a single light source and an elongated "spot" to cover both picture gates, improved illumination is secured as both pictures are projected upon the same screen area. The projection of two pictures by means of a single light source, and an elongated spot is also well-known.

Where desired, one picture of the pair may be blocked off entirely, that is, no light permitted to pass through that portion of the film, or on the other hand, the second picture of a pair may be omitted entirely as they are intended to be exact duplications of each other in black and white effects.

For color, the individual pictures comprising a pair may be taken through red and green or other complementary color filters respectively, to produce color separation negatives. When these duplicate pictures have complementary color records are projected through similar filters, the result is a harmoniously blended color picture by the well-known additive process.

However, it is pointed out that although the illumination be somewhat uneven, the same color record appears at any given point at each cycle of the intermittent movement and the picture is, therefore, constantly lighted. This is in contrast to additive methods where alternate or complementary color records appear at each cycle or where a given color record appears at alternate gates. Either of the latter conditions result in so-called "color pounding" or color bombardment, due to the pulsating amounts of the colored lights projected to the screen if the illumination be not continuous and uniform. Attention is called to the fact that with this system, any given point at either gate is covered with the same image at each cycle of intermittent movement, and therefore the color intensity transmission is equal at each intermittent cycle.

By taking the original pictures in the taking camera from two horizontally separated viewpoints and by using suitable mechanisms such as filters to restrict the proper picture to each eye of the observer, stereoscopic effects may be accomplished, all of which is well-known.

No projection apparatus or taking camera is illustrated, for the reason that the present invention does not contemplate the use of any special type of apparatus other than is well-known to the motion picture art.

From the above, it will be apparent that there has been presented a system whereby there may be produced a sub-standard film carrying a standard sound track, with all of the attendant advantages of standard film and sub-standard film, but with none of their disadvantages.

Such film may be projected in the present day 16 mm. projectors modified to either feed the film horizontally two frames at a time, or with appropriate lenses to twist the picture during projection from a vertical to a horizontal position. This modification presents no problem to the motion picture industry for this operation is well-known. Obviously the invention contemplates the addition to such projection equipment of sound reproduction mechanism. Such a film and projector is readily adapted for the projection of either black and white, color or stereoscopic effects with minimum effort.

While an embodiment of the invention has been described with reference to 16 mm. film, yet obviously by suitably proportioning the size of the pictures, 28 mm. film or any other sub-standard film may be likewise utilized. The invention is, therefore, not to be restricted to the use of 16 mm. film, but on the other hand is to be construed broadly as involving the combination of sub-standard pictures, that is, pictures having a dimension less than the corresponding dimension of a picture commonly used with the 35 mm. film, and a sound track having the approximate or even greater dimensions including length, of those normally used with a standard film, but in any event, of dimensions greater than would exist were the standard size sound track reduced in the same proportion as the picture.

I claim:

1. A sub-standard motion picture film having thereon a single series of pictures with their longer dimension parallel to the film length, the sum of the longer dimension of two pictures being substantially equal to the height of a 35 mm. picture, and a sound track of standard 35 mm. length synchronized therewith.

2. The film of claim 1 in which each two succeeding pictures are duplicates.

3. The film of claim 1 in which each two succeeding pictures are complementary color records.

4. The film of claim 1 in which each two succeeding pictures are stereoscopic complements.

5. A sub-standard motion picture film having thereon a single series of pictures with their longer dimension parallel to the film length, the sum of the longer dimension of two pictures being substantially equal to the height of a 35 mm. picture, and a sound track of 35 mm. film dimensions both as to length and width synchronized therewith.

GEORGE LANE.